E. W. BURGESS.
MOWING MACHINE.
APPLICATION FILED JULY 5, 1916.
1,278,103.
Patented Sept. 10, 1918.
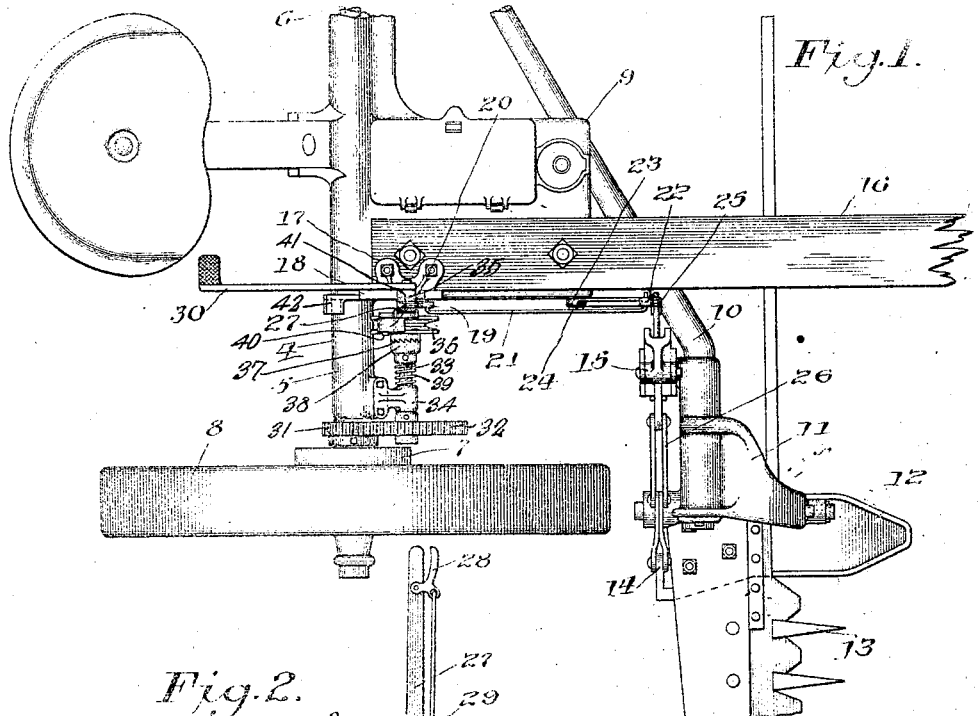
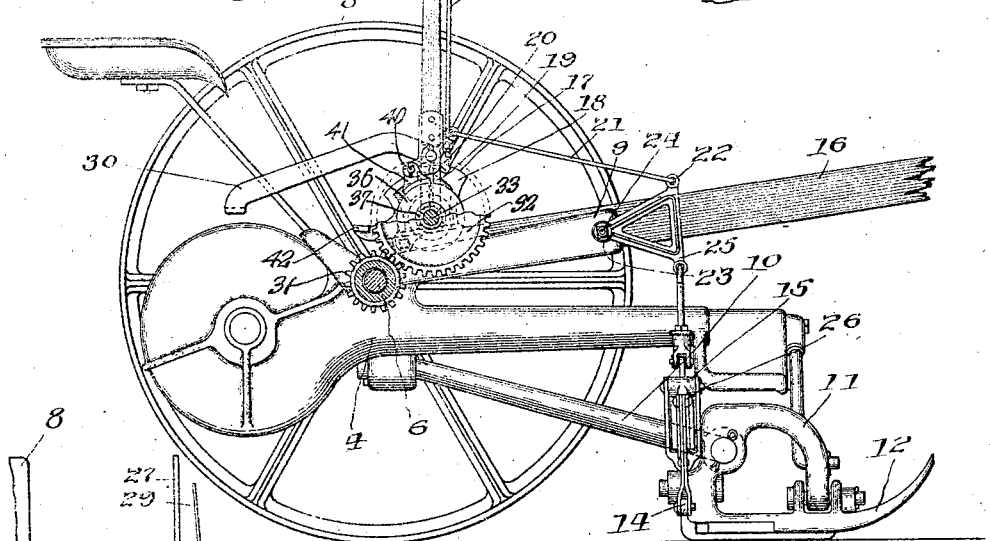
Inventor.
Edward W. Burgess
By Chas. E. Lord
Atty.

UNITED STATES PATENT OFFICE.

EDWARD W. BURGESS, OF CHICAGO, ILLINOIS, ASSIGNOR TO INTERNATIONAL HARVESTER COMPANY OF NEW JERSEY, A CORPORATION OF NEW JERSEY.

MOWING-MACHINE.

1,278,103.  Specification of Letters Patent.  Patented Sept. 10, 1918.

Application filed July 5, 1916. Serial No. 107,678.

*To all whom it may concern:*

Be it known that I, EDWARD W. BURGESS, a citizen of the United States, residing at Chicago, in the county of Cook and State of Illinois, have invented certain new and useful Improvements in Mowing-Machines, of which the following is a full, clear, and exact specification.

My invention relates to mowing machines, and in particular to improved mechanism for adjusting the coupling frame and finger bar in varying planes; its object being to provide means operatively connected with the driving axle to automatically assist the operator in raising the coupling frame and finger bar as the machine advances and to permit of adjustment while the machine is stationary.

This object is attained by means of the mechanism illustrated in the accompanying drawings, in which—

Figure 1 is a top plan view of part of a mowing machine embodying my invention;

Fig. 2 is a side elevation of Fig. 1; and

Fig. 3 is a front elevation, partly in section, of Figs. 1 and 2, designed to illustrate the construction of my improved adjusting mechanism.

The same reference characters designate like parts throughout the several views.

The mowing machine includes a main frame 4, having a transversely disposed tubular member 5, in which is journaled a driving axle 6, having driving ratchets 7 secured to its opposite ends, one only being shown, and which is operatively connected with a traction wheel 8 journaled upon the axle, 9 a forwardly extending part of the main frame, 10 a coupling frame member having its stubbleward end pivotally connected with the main frame, 11 a yoke pivotally mounted upon the coupling frame, 12 a shoe pivotally connected with the yoke, 13 a finger bar secured to the shoe, 14 an upstanding arm on the shoe, 15 a lever mechanism pivotally connected with the yoke 11, 16 a draft tongue secured to the main frame, 17 a bracket member secured to the tongue and having a common form of toothed sector 18 integral therewith, 19 a vertically disposed arm having its lower end pivotally connected with the toothed sector and carrying a spring-pressed detent 20 adapted to engage with the toothed sector, the arm being turned forward at its upper end and provided with a laterally disposed opening that receives the hooked rear end of a link 21 whereby it is operatively connected with an arm 22 of a three-armed lever, having a second arm 23 pivotally connected with the main frame at 24, its remaining arm 25 having a flexible link mechanism 26 connected with the lever mechanism 15 and connecting the lever mechanism with the upstanding arm 14 on the shoe 12, 27 a hand lever having its lower end pivotally connected with the arm 19, preferably coaxially with the detent 20, and having a common form of thumb lever 28 pivotally mounted upon its upper end and connected, by means of a link 29, with the detent 20, 30 a foot lever having a common form, and having the front end thereof pivotally connected with the arm 19 in a manner to coöperate therewith in raising the coupling frame and finger bar to predetermined planes through a predetermined throw of the arm, and then permitting the arm to be given a greater throw if desired in a well-known way.

To enable the operator to make available the draft power of the machine to assist in raising the coupling frame and finger bar, I have provided the following mechanism including a gear member 31, preferably integral with the driving ratchet 7 and meshing with a second gear member 32 secured to one end of a shaft 33 disposed parallel with the axle, having one end journaled in a bearing box 34 secured to the main frame, and its opposite end in a bearing sleeve 35 integral with the bracket member 17, and upon which the arm 19 is mounted coaxially with the shaft, 36 indicates a friction sheave journaled upon the shaft and having one end of its hub provided with clutch teeth 37 adapted to operatively engage with corresponding teeth upon a sleeve 38 splined upon the shaft 33 and normally yieldingly pressed in engagement with the shaft by means of a compression spring 39 encircling the shaft and reactive between the bearing box 34 and the sleeve. The lower end of the hand lever 27 is turned rearward and downward and carries a laterally extending stud 40, upon which is pivotally mounted a brake shoe 41 adapted to engage with the friction sheave 36. When the machine is advancing the sheave 36 is constantly rotated by means of its gear connection with the driving axle, and when the operator desires to raise the coupling frame and finger bar he grasps the hand lever 27 in the usual way and pulls rearward thereon with sufficient force to hold the brake shoe 41 in engagement with the sheave, and then the hand lever moves with the sheave by power derived from the moving machine, the operator continuing to pull upon the hand lever until the desired lift has been secured, and the parts can then be retained in their adjusted position by means of the detent and toothed sector in the usual way. When the hand lever 27 has been turned rearward to the limit of its operative movement, it engages with a stop member 42 carried by the bracket member 17 in a manner to hold the lever against a further movement, and a continued movement of the arm 19 releases the brake 41 from engagement with the friction sheave 36.

If it be desired to adjust the coupling frame and finger bar when the machine is not in motion, the spring 39 will permit the sleeve 38 to move longitudinally upon the shaft and allow the sheave to rotate independent of the shaft 33. When the hand lever 27 is moved forward, it engages with the adjacent end of the link 21 in a manner to limit a turning movement thereof relative to the arm 19.

Having shown and described an embodiment of my invention, I do not desire that it be confined to the specific details of the structure as illustrated, it being understood that changes may be made in the form, proportion and organization of its several parts without departing from the spirit of the invention as indicated by the scope of the appended claims.

What I claim as my invention, and desire to secure by Letters Patent, is:

1. In combination, a main frame, a power axle carried thereby, a vertically adjustable frame carried by said main frame, means for manually adjusting said vertically adjustable frame, and means operatively connected to said power axle by movement of said adjusting means for assisting the said means in adjusting said frame vertically, said manual adjusting means being operable to vertically adjust said adjustable frame independent of power derived from the power axle.

2. In a mowing machine, a frame, a driving power axle carried by said frame, a rising and falling coupling frame and finger bar connected with said frame, means for manually adjusting said coupling frame and finger bar in varying planes, said means including a manually operable lifting lever, and power actuated elements coöperating with said manual adjusting means and operatively connected thereto by movement of said lifting lever to assist in adjusting said coupling frame, said lifting lever being operable to lift said coupling frame independent of the power actuation.

3. In a mowing machine, a frame, a driving power axle journaled in said frame, a rising and falling coupling frame and finger bar connected with said frame, means for adjusting said coupling frame and finger bar in varying planes, said means including a manually operable lifting lever, and mechanism under the control of said lever for operatively connecting said power axle with said adjusting means, said lifting lever being operable to lift said frame independent of power derived from said power axle.

4. In a mowing machine, a main frame, a power axle journaled on said frame, a coupling frame and finger bar adjustably carried by said main frame, a lifting lever pivoted on said main frame and operatively connected to said coupling frame and finger bar, and means actuated by said lever as it is moved about its pivot in a direction to lift said coupling frame for operatively connecting said lever to said power axle, said lifting lever being operable to lift said coupling frame and finger bar independent of power derived from the power axle.

5. In a mowing machine, a frame, a driving power axle carried by said frame, a rising and falling coupling frame and finger bar pivotally connected with said frame, manually operated means for adjusting said coupling frame and finger bar in varying planes, and means operable by said adjusting means for connecting said driving power axle with said manually operable means, said last named means being operable to adjust said coupling frame independent of power derived from said power axle.

6. In a mowing machine, a frame, a driving power axle carried by said frame, a rising and falling coupling frame and finger bar pivotally connected with said frame, manually operable means for adjusting said coupling frame and finger bar in varying planes, and means controlled by said manually operable means for operatively connecting said driving power axle with said manually operable means, said connecting means including means permitting independent actuation of said manually operable means to adjust said frame and bar independent of power derived from said power axle.

7. In a mowing machine, a frame, a driving power axle mounted upon the frame, a rising and falling coupling frame and finger bar pivotally connected with said frame, means for adjusting said coupling frame and finger bar in varying planes, said means including a hand lever mechanism operatively connected with said coupling frame and finger bar, a constantly rotatable element operatively connected with said driving power axle, and means carried by said lever and engageable with said constantly rotatable element upon movement of said lever for operatively connecting said lever to said power axle, said lever being operable to lift said frame and bar independent of power derived from said axle.

8. In a mowing machine, a frame, a driving power axle mounted upon said frame, a rising and falling coupling frame and finger bar pivotally connected with said frame, means for manually adjusting said coupling frame and finger bar in varying planes, said means including a hand lever mechanism operatively connected with said coupling frame and finger bar, a constantly rotatable friction element operatively connected with said driving power axle, and a brake shoe carried by said hand lever mechanism and adapted to engage with said friction element, said manual adjusting means being operable to raise said coupling frame and finger bar independent of power derived from said power axle.

9. In a mowing machine, a frame, a driving axle journaled in said frame, a rising and falling coupling frame and finger bar connected with said frame, means for adjusting said coupling frame and finger bar in varying planes, said means including a hand lever mechanism mounted on said frame and operatively connected with said coupling frame and finger bar, a shaft journaled upon said frame and operatively connected with said driving axle, a friction element rotatable with said shaft, and a brake shoe carried by said hand lever mechanism and adapted to engage with said friction element.

10. In a mowing machine, a frame, a driving axle journaled in said frame, a rising and falling coupling frame and finger bar connected with said frame, means for adjusting said coupling frame and finger bar in varying planes, said means including a hand lever mechanism mounted on said frame and operatively connected with said coupling frame and finger bar, a shaft journaled upon said frame and operatively connected with said driving axle, a spring-pressed clutch member slidably mounted upon said shaft and rotatable therewith, a friction sheave journaled upon said shaft and engaging with said clutch member, and a brake shoe carried by said hand lever mechanism and adapted to engage with said friction sheave.

11. In a mowing machine, a frame, a driving axle journaled upon said frame, a rising and falling coupling frame and finger bar connected with said frame, means for adjusting said coupling frame and finger bar in varying planes, said means including a shaft operatively connected with said driving axle, a bracket secured to said frame and having said shaft journaled therein, an arm vibratable about the axis of said shaft and having its free end operatively connected with said coupling frame and finger bar, a rotatable friction element mounted upon said shaft adjacent said arm, a manually operable lever pivotally mounted upon said arm, and a brake shoe carried by said lever and adapted to engage with said rotatable friction element.

12. In combination, a frame, a power shaft, a member adjustable relative to said frame, means for connecting said power shaft to said member to adjust the member by power, and single means for controlling said connecting means and for adjusting said member by hand independent of said power shaft.

13. In combination, a frame, a power shaft, a member adjustable relative to said frame, means including a constantly rotatable member for connecting said power shaft to said member to adjust said member by power, and single means for controlling said connecting means and for adjusting said member by hand independent of said power shaft.

14. In combination, a frame, a power shaft, a member adjustable relative to said frame, means including a constantly rotatable member for connecting said power shaft to said member to vertically adjust said member by power, and single means for controlling said connecting means and for adjusting said member by hand independent of said power shaft, said controlling and adjusting means having means adapted to coöperate with said constantly rotatable member.

In testimony whereof I affix my signature.

EDWARD W. BURGESS.